(12) United States Patent
Schmidt et al.

(10) Patent No.: US 6,905,433 B2
(45) Date of Patent: Jun. 14, 2005

(54) DEVICE FOR CONTROL OF A HYDRAULICALLY ACTUATABLE SHIFTING ELEMENT

(75) Inventors: Thilo Schmidt, Meckenbeuren (DE); Georg Gierer, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/647,810

(22) Filed: Aug. 25, 2003

(65) Prior Publication Data

US 2004/0043858 A1 Mar. 4, 2004

(30) Foreign Application Priority Data

Aug. 30, 2002 (DE) .......................................... 102 39 915

(51) Int. Cl.$^7$ .............................................. F16H 30/00
(52) U.S. Cl. ........................ 475/121; 475/116; 192/86; 192/85 AA; 192/109 F; 192/3.57; 192/3.58
(58) Field of Search .................................. 475/116, 121, 475/212; 192/3.57, 3.58, 85 AA, 86, 109 F

(56) References Cited

U.S. PATENT DOCUMENTS

| | | | |
|---|---|---|---|
| 4,420,994 A | * 12/1983 | Muller et al. | .............. 477/129 |
| 4,637,504 A | 1/1987 | Rule et al. | .............. 192/87.17 |
| 4,660,693 A | * 4/1987 | Taga et al. | .............. 477/156 |
| 4,838,126 A | 6/1989 | Wilfinger et al. | .............. 74/869 |
| 5,103,930 A | * 4/1992 | Gierer | .............. 180/249 |
| 5,305,862 A | * 4/1994 | Gierer | .............. 192/3.3 |
| 6,827,194 B2 | * 12/2004 | Steinel et al. | .............. 192/86 |

FOREIGN PATENT DOCUMENTS

| | | | |
|---|---|---|---|
| DE | 38 50 354 T2 | 10/1994 | .......... F16H/61/02 |
| DE | 197 54 491 A1 | 6/1999 | .......... F16D/59/02 |
| EP | 405590 A2 * | 1/1991 | .......... F16H/61/02 |

* cited by examiner

Primary Examiner—Rodney H. Bonck
Assistant Examiner—David D. Le
(74) Attorney, Agent, or Firm—Davis & Bujold, P.L.L.C.

(57) ABSTRACT

A device for control of a hydraulically actuatable shifting element of a motor vehicle transmission, having one clutch piston which defines, with a first surface, a hydraulically pressurizable piston space and, with a second surface of different size, a hydraulically pressurizable reset space and comprising a first clutch valve associated with the piston space, a second clutch valve associated with the reset space and a holding valve associated with the reset space. The valves can be moved according to a control pressure adjusted by a pressure adjuster, a change between a pressurization of the clutch piston on the piston space side and on the reset space, side being performed as a control function so that the clutch piston on its surface facing the reset space is pressurized in an unshifted state of the shifting element and is discharged in a shifted state of the shifting element.

15 Claims, 4 Drawing Sheets

DEVICE FOR CONTROL OF A HYDRAULICALLY ACTUATABLE SHIFTING ELEMENT

FIELD OF THE INVENTION

The invention relates to a device for control of a hydraulically actuatable shifting element of a motor vehicle transmission, specially of a powershift transmission.

BACKGROUND OF THE INVENTION

Powershift transmissions in which a change in ratio or a change in gear often results as an overlapping shift with direct torque transfer between two shifting elements, but also double-clutch transmissions, require accurate regulation. For example, in an overlapping shift, the moment of torque transfer must be very precisely determined according to the driving situation and load so as to satisfy the requirements of riding comfort and driving dynamics.

The shifting of a shifting element designed, for example, as a multi-disc clutch of a power transmission, from an actuated to an unactuated state results in the practice by displacement of a double-acting clutch piston by means of a hydraulic medium, the clutch piston defining, with one first surface, a clutch space pressurizable with hydraulic medium and, with a second surface, a rest space with a resetting device acting upon the piston. As a rule, the clutch is actuated or engaged against the force of a spring, mainly a cup spring, or against a counterpressure always acting upon the clutch piston on the side of the reset space.

In such a structure, the needed shifting pressure has to be increased by the power of the counterpressure or of the spring tension thus reducing the available control range of a pressure pre-control valve or control valve customarily used as actuator.

In the typical case of use of a clutch in a powershift transmission, this means that approximately 15% of the pressure power needed to ensure the transmitting capacity of the clutch is supported on a housing via a spring in the reset space and is not available for the transmitting capacity. This reduction of the utilizable control range of the actuator is especially problematic in an area of low pressure in which a pressure regulator usually shows a very flat behavior and to ensure a certain pressure power has to be substantially more heavily supplied with current than is the case in areas of higher pressure.

Particularly problematic are shifts to gears with a higher power ratio, since, on one hand, very high torques appear in the shifting elements and, on the other, high requirements are placed on the shifting quality due to the low speed.

This results in a conflict of interest in the layout of the shifting elements, since a high transmitting capacity requires a large clutch piston which disadvantageously is very sensitive to interruptions and needs a strong recoil spring.

However, a strong recoil spring has the disadvantages of great spring tension tolerance, great hysteresis and strong setting property together with the disadvantages typical in the use of springs. To the latter belongs a larger installation space, as a rule, the requirement that the aging of the spring be taken into account in the new layout and high expenses for adaptations in the transmission software which take into account the tolerance of the spring in the new state and its wear characteristics.

In addition, a strong recoil spring has to be compensated by an adequate layout of the control valve which results in an impaired ratio of the transmitted torque in correlation to the expenditure amount and thus to an impairment of the degree of effectiveness. Problematic here, on one hand, is the comparatively strong excitation pulse required to overcome the reaction inertia of the clutch piston and the fact that quantity of the output signal of the current of the control valve can be delivered only in discrete steps which, in as data amount imaginably to be processed, can result in a jerky movement of the clutch piston.

To implement a high transmitting capacity also requires a large friction surface to be distributed among a large number of friction elements or discs subject to a limited admissible contact pressure. But a large number of friction elements disadvantageously implies a great air play and thus a long travel stroke.

In the solutions known from the practice where the clutch is shifting or the clutch piston adjusted against a cropping out counterpressure, there is, likewise, the disadvantage of the reduction of the control range available and of the impairment of the ratio of the control pressure to be applied relative to the transmissible torque of the clutch.

The problem on which this invention is based is to provide a device for control of a hydraulically actuatable shifting element of a motor vehicle transmission, especially of a powershift transmission, with which the above described disadvantages are overcome, wherein a control of the shifting element is specially to be implemented in which the required spring tension of a recoil spring can be reduced, as much as possible and, at the same time, the ratio of a transmitted torque to a quantity of an output signal or a control current with low torque is increased without reducing the transmitting capacity.

According to the invention, the problem is solved with a device for control of a hydraulically actuatable shifting element of a motor vehicle, that is, with a clutch piston which defines, with one first surface, a hydraulically pressurizable piston space and, with one second surface of different size, a hydraulically pressurizable reset space, and having a slide valve system comprising a first clutch valve associated with the clutch space, a second clutch valve associated with the reset space and a holding valve associated with the reset space, which valves are displaceable according to a control pressure adjusted by a pressure adjuster, a change between a pressurization of the clutch piston, on the side of the clutch space and on the side of the reset space, being carried out as a control function in a manner such that the clutch piston is pressurized on its surface facing the reset space, in an unshifted state of the shifting element and, in a shifted state of the shifting element, is unloaded and both surfaces of the clutch piston, when the shifting element is engaged, are pressurized with at least approximately the same pressure up to a pre-defined pressure-adjuster control pressure.

SUMMARY OF THE INVENTION

The inventive device has the special advantage that it is possible to omit a constantly present counterforce for resetting the clutch piston that reduces the utilizable control range and which In the solutions already known, is prepared by a cup spring or a permanent hydraulic counterpressure so that said power is additionally available for the control range and the transmitting capacity of the clutch. At the same time, due to an almost completely utilizable pre-control pressure range, a great dissolution of the ratio of a control current of a pre-control pressure to the transmitted torque on the clutch results.

In the inventive solution an increase of the dissolution of the transmitted torque to the quantity of the output signal is mainly obtained by the fact that the surface of the clutch piston facing the reset space is intermittently pressurized until reaching a pre-defined pressure-adjuster control pressure with the same pressure as the surface of the clutch piston facing the clutch space.

When the clutch piston is pressurized with the same pressure on both sides, only the differential surface between the surfaces facing the clutch space and the reset space undergoes a power action. In this state, since the system is at its most insensitive position relative to the pressure fluctuations and the dissolution of the transmitted torque to the quantity of output signal is at its greatest, it is possible to carry out shifts that are especially critical for shifting quality.

In an advantageous embodiment of the invention, therefore, the ratio of the surfaces on the clutch piston and the pre-defined pressure-adjuster control pressure are laid out so that it is possible to carry out with equal pressure shifts critical to the shifting quality of the phase of the pressurization of both surfaces of the clutch piston before the pressure in the reset space, after reaching the pre-defined pressure-adjuster control pressure, is reduced by the second clutch valve and the pressure in the clutch space is further increased by the first clutch valve.

The inventive device is also advantageous in that only small tolerances of the piston force, conditioned by a sealing element friction, have to be accepted and the installation space required is very small.

In the inventive device, a recoil spring for the clutch piston can be omitted unless an emergency program of the concerned transmission requires an—adequately weak—spring in order to open a closed clutch, for example, for a trailing operation.

To implement the inventive device, any additional valves like magnetic valves or added actuators are not needed together with the valves and mentioned pressure adjuster since a pressure reduced by a system pressure can be used as counterpressure, for example, which, in any case, is fed to the shifting element.

The pressurization and discharge of the clutch piston, on the side of the reset space, can basically be effected with a shifting valve, but it is more advantageous to provide an inverse proportional pressure-reducing valve for the purpose of a control pressure with a tie to the pressure-adjuster control pressure concentrated in the first and second clutch valves or to the pressure concentrated in the clutch space which forms a holding valve.

For pressurizing the clutch space and for resetting the clutch piston by pressurizing the reset space in the inventive manner, wherein the reset space in unshifted state of the shifting element is pressurized to the maximum and in shifted state of the shifting element is pressureless, the first clutch valve is preferably designed as a proportional pressure-reducing valve and the second clutch valve as an inverse proportional pressure-reducing valve with a pressure-adjuster control pressure shared with the first clutch valve or as proportional pressure-reducing valve with separate pressure-adjuster control pressure.

The configuration of the second clutch valve as an inverse proportional valve, that is, which as the pressure-adjuster control pressure increases delivers to the reset space a lower pressure, has the advantage that the inventive device can be implemented with a lower number of actuators and structural elements.

In an advantageous embodiment of the invention can be provided that a holding valve is also associated with the clutch space. Such a holding valve, which can be designed in a manner known per se, holds the clutch closed even during transmission of high torques whereby the use of a clutch valve with a steep characteristic line and a correspondingly poorer ratio of transmitted torque to a quantity of output signal the same as a less limitation of the transmitting capacity can be eliminated.

BRIEF DESCRIPTION OF THE DRAWINGS

The invention will now be described, by way of example, with reference to the accompanying drawings in which.

DETAILED DESCRIPTION OF THE INVENTION

Figure 1:
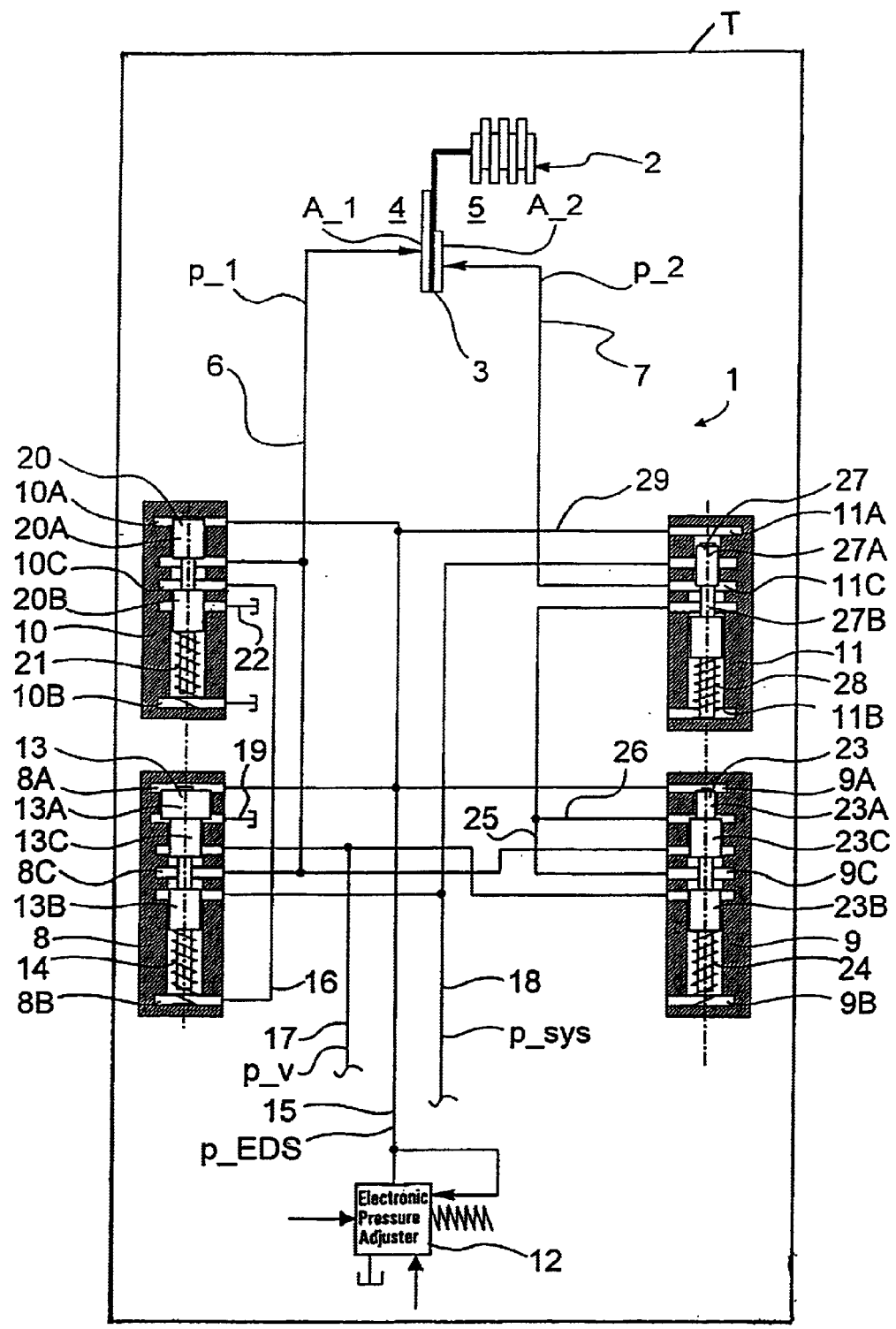
FIG. 1 is a diagrammatic sketch of a valve device for control of a clutch in which a clutch piston is displaceable by pressurization or pressure discharge of a clutch space, on one side, and of a reset space, on the other.
Figure 3:
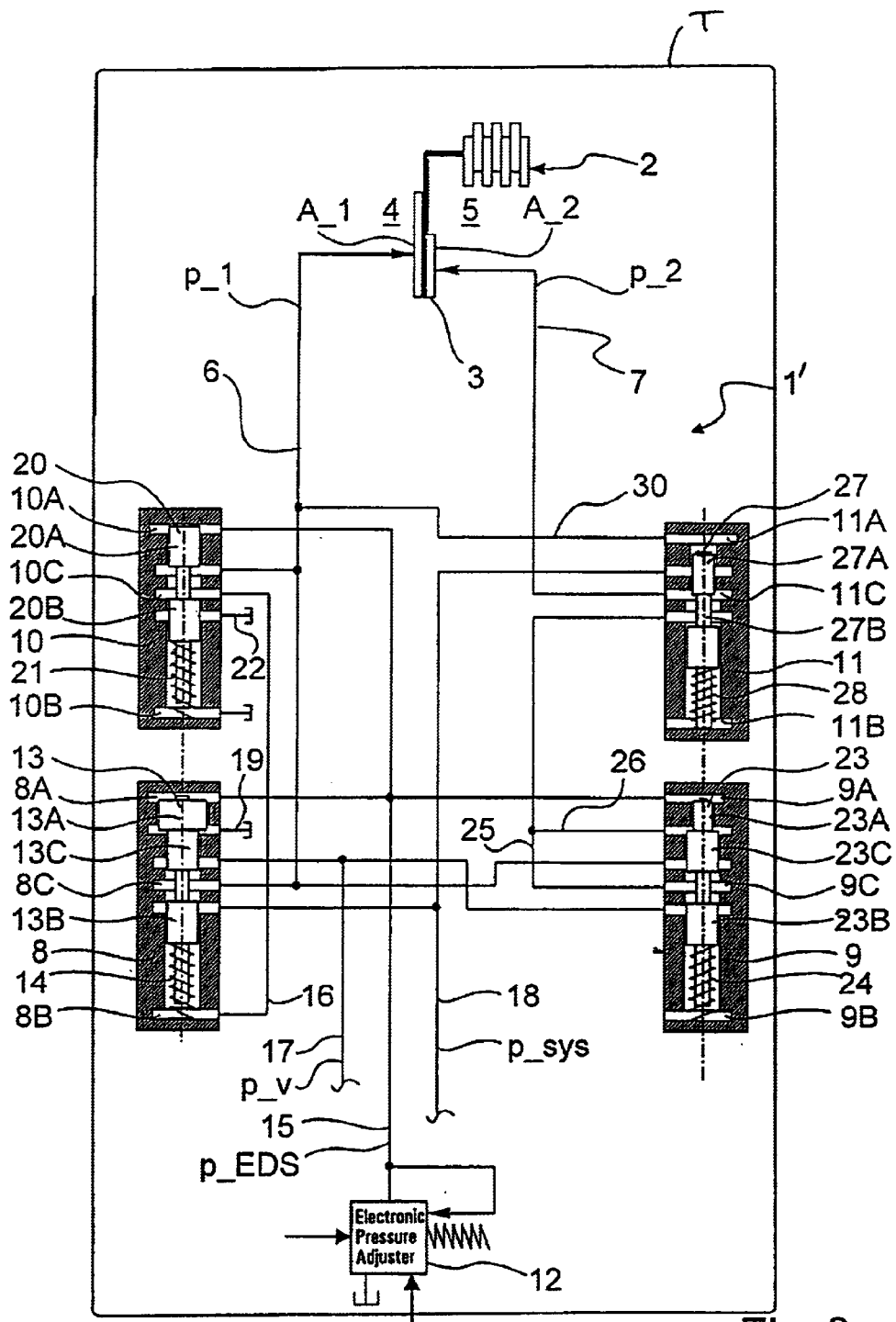
FIG. 3 is a diagrammatic sketch of a second design of a valve device for control of a clutch which differs from the design according to FIG. 1 by a control pressure of a holding valve associated with a reset space and FIG. 4 is a diagram of power and pressure curves which can be implemented by the device according to FIG. 3.

Referring to FIG. 1 and FIG. 3, respectively, they show a device 1, 1' for control of a hydraulically actuatable clutch 2 designed as a multi-disc clutch of a powershift transmission T of a motor vehicle.

The clutch 2 has a clutch piston 3, only symbolically shown in the figures, which is displaceably movable in a cylinder (not shown in detail), and which defines, with a first surface A_1, a piston space 4 pressurizable with hydraulic medium, and with a second surface A_2 lying opposite and of smaller size a reset space 5. The piston space 4 and the reset space 5 are symbolically indicated in FIG. 1 and FIG. 3 by the reference numerals thereof.

To actuate the clutch 2, the piston space 4 can be pressurized with a hydraulic medium, as a pressure medium which, via a line 6, can be passed thereinto with a pressure p_1 and again removed therefrom. To move the clutch piston 3 from a shifting position back to an idle position, one hydraulic reset device is provided in a manner such that the clutch piston 3 can, likewise, be pressurized with hydraulic medium on the side of the reset space 5, it being possible to pass the hydraulic medium with a pressure p_2, via a line 7, into the reset space 5 and to remove it therefrom. The lines 6, 7, respectively, connected with the clutch space 4 and the reset space 5, lead to a sliding valve system by means of which the pressurization and discharge of the piston space 4 and of the reset space 5 are adjusted.

Said sliding valve system has, in the embodiment shown, a first clutch valve 8 associated with the piston space 4, a second clutch valve 9 associated with the reset space 5, a first holding valve 10 associated with the piston space 4 and a second holding valve 11 associated with the reset space 5.

All valves 8 to 11 are designed as shift valves, respectively, having several piston sections which, according to a control pressure p_EDS concentrated on the shift valve system and adjusted by an electronic pressure adjuster 12, are movable in a respective housing and thus unhindered or reduced to allow a through flow of a system pressure p_sys into the piston space 4 and/or the reset space 5.

The electronic pressure adjuster 12 shown in the Figures can be of conventional design. Although in the preferred embodiments shown, only one pressure adjuster is provided for delivering the control pressure p_EDS to the individual valves, it is also possible to alternatively use several pressure adjusters for this purpose.

The first clutch valve 8 is designed with a valve piston 13 which has several sections 13A, 13B 13C of which one first piston section 13A defines, with the valve housing, a first valve space 8A pressurizable via a control pressure line 15 with control pressure p_EDS set by the electronic pressure adjuster 12.

One other piston section 13B similar to a set piston, defines a second valve space 8B in the valve housing which is connected via a pressure line 16 with the first holding valve 10 of the piston space 4 and is equipped with a spring device 14 that counteracts the pressure-adjuster control pressure p_EDS.

Between the first valve space 8A and the second valve space 8B is a third valve space 8C which is connected with the pressure line 6 leading to the piston space 4 and with a conveying pressure line 17 that conveys a fill pressure p_v. Said third valve space 8C is defined by the second piston section 13B and a third piston section 13C, abutting against the first piston section 13A, and designed with a smaller diameter than the latter and with the same diameter as the second piston section 13B.

Depending on the valve position, the third valve space 8C can be connected with a pressure line 18 that conveys system pressure p_sys, when the first valve space 8A is pressurized, a displacement of the valve piston 13 results which increasingly opens a connection to the pressure line 18 that conveys system pressure p_sys so that the pressure medium under system pressure p_sys can flow, via the third valve space 8C, to the connection with the pressure line 6 leading to the piston space 4. During the piston displacement for opening the connection for the system pressure p_sys, a discharge line 19, which branches off between a connection of the pressure line 17 conveying the fill pressure p_v and the first valve space 8A, is increasingly closed by the third piston section 13C.

The first holding valve 10 associated with the piston space 4 is similarly built with a valve piston 20 having several sections 20A, 20B and including a first valve space 10A pressurizable with the pressure-adjuster control pressure p_EDS, a second valve space 10B which is provided with and relieved of pressure by, a spring device 21 that counteracts the pressure-adjuster control pressure p_EDS and a third valve space 10C which is connected with the pressure line 16 leading to the second valve space 8B of the first clutch valve 8 and, depending on valve position, is connected with the pressure line 6 leading to the piston space 4.

When the first valve space 10A is pressurized, the valve piston 20 is displaced so that the first piston section 20A, with its control edge facing the third valve space 10C, increasingly overlaps a connection to the pressure line 6 which leads to the piston space 4. The second piston section 20B, with its control edge facing the third valve space 10C, is simultaneously displaced against a connection of a discharge line 22.

The second clutch valve 9 which, compared to the first proportionally designed clutch valve 8, is designed as an inverse proportional pressure-reducing valve, is controlled with the same pressure-adjuster control pressure p_EDS as the first clutch valve 8 and the first holding valve 10 associated with the piston space 4. As to its construction, the second clutch valve 9, likewise, has a valve piston 23 with several piston sections 23A, 23B, 23C, but with a an inverse gradation to that in the valve piston 13 of the first clutch valve 8.

A first piston section 23A which, compared to a second piston section 23B and a third piston section 23C of the same diameter, is designed with a smaller diameter, defines a first valve space 9A with the valve housing which can be pressurized via a connection to the control pressure line 15, with the pressure-adjuster control pressure p_EDS.

The second piston section 23B, similar to a step piston, defines in the valve housing a second valve space 9B which is free of pressure and in which is located a spring device 24 that counteracts the pressure-adjuster control pressure p_EDS.

Between the first valve space 9A and the second valve space 9B is a third valve space 9C defined by the second piston section 23B and the third piston section 23C abutting against the first piston section 23A.

The third valve space 9C is connected, via a line 25, with the holding valve 11 associated with the reset space 5 and, depending on its position, can be connected with the reset space 5. In addition, the third valve space 9C has a connection which leads to the pressure line 6, leading to the piston space 4 and to the third valve space 8C of the first clutch valve 8 and the third valve space 10C of the first holding valve 10 and which interacts with a control edge of the third piston section 23C facing the third valve space 9C interacts with a connection to the pressure line 17 conveying the filling pressure p_v, said connection being increasingly uncovered during pressurization of the first valve space 9A. During the displacement of the piston in a direction of the second valve space 9B, a connection located between the connection to the pressure line 6 and the first valve space 9A, one other line 26 that discharges in line 25 leading to the second holding valve 11 associated with the reset space 5 is increasingly released by the third piston section 23C.

The second holding valve 11, associated with the reset space 5, is an inverse proportional pressure-reducing valve whose piston 27 is, in turn, designed with several sections 27A, 27B of which a first section 27A defines a first valve space 11A with the valve housing pressurizable with a control pressure and a second valve piston 27B defines with the valve housing a second valve space 11B which is provided with, and relieved of pressure by, a spring device 28 that counteracts the control pressure.

Between the piston sections 27A, 27B is formed a third valve space 11C which has a connection to the pressure line 7 leading to the reset space 5 and, in the direction of the first piston section 27A, a connection interacting therewith is connected with the pressure line 18 conveying the system pressure p_sys, the same as in the direction of the second piston section 27B, a connection interacting therewith is connected with the pressure line 25 or 26 leading to the second clutch valve 9, the latter connection being increasingly opened when the first valve space 11A is pressurized.

In the embodiment of FIG. 1, the control pressure for the holding valve 11, associated with the reset space 5, is the control pressure p_EDS adjusted by the electronic pressure adjuster 12 and fed, via line 15, to the sliding valve system and which can arrive at the first valve space 11A of the second holding valve 11 via a branch line 29 of the control pressure line 15.

On the other hand, in the embodiment of FIG. 3, the control pressure of the second holding valve 11 associated with the reset space 5 is the pressure p__1 which is fed to the piston space 4 and which, from the pressure line 6 leading to the piston space 4, arrives via a branch line 30 at the first valve space 11A of the second holding valve 11.

Figure 2:
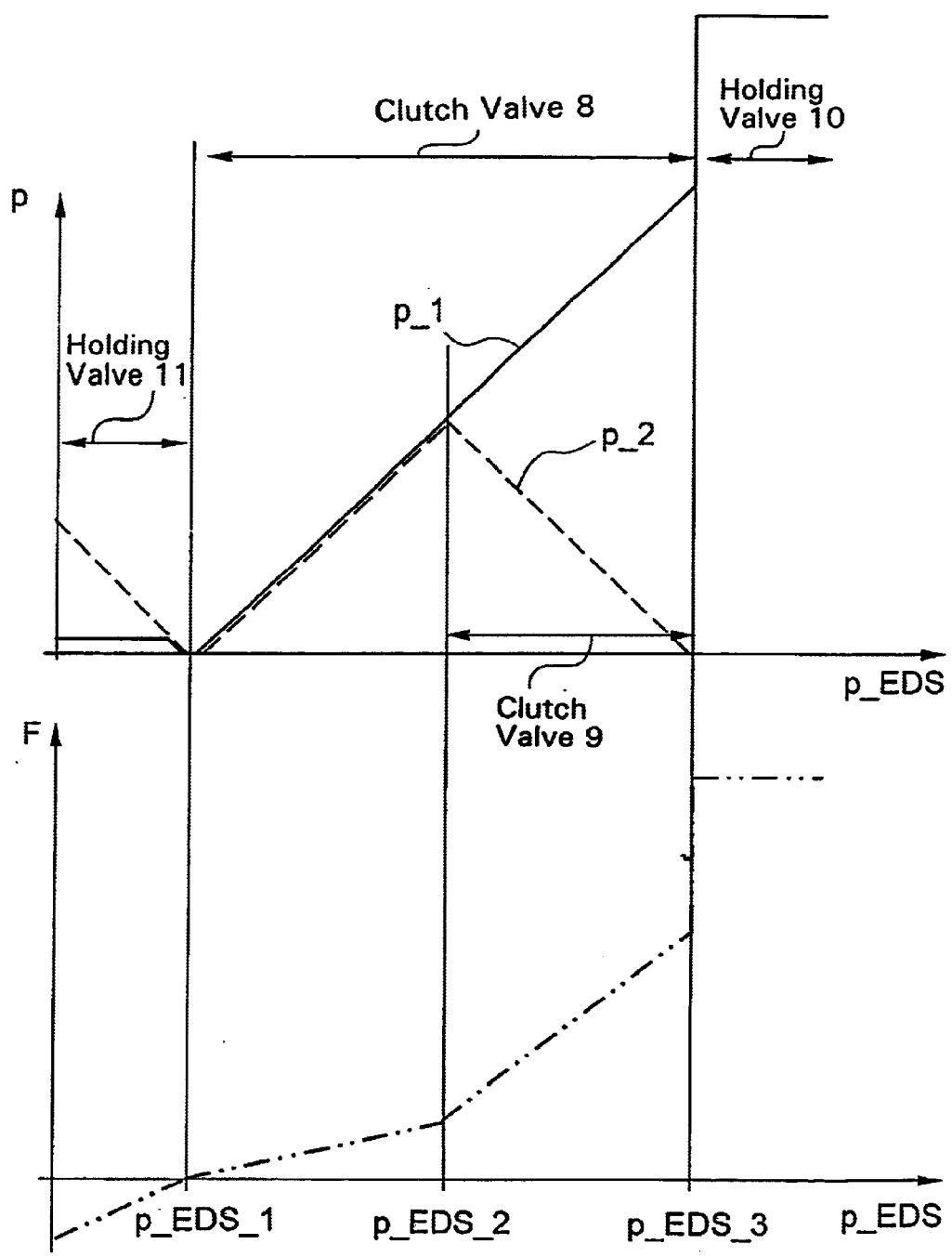
FIG. 2 is a diagram of power and pressure curves which can be represented by means of the valve device according to FIG. 1.

In FIG. 2 is shown, with relation to the control pressure p__EDS adjusted by the pressure adjuster 12, the curve of the pressure p__1 on the side of the clutch space 4 of the clutch piston 3, of the pressure p__2 adjacent to the clutch piston 3 on the side of the reset space 5 and of a piston force F in the closing direction of the clutch 2.

At the start of the control of the slide valve system, in a pressure-adjuster control pressure p__EDS of 0 bar, the pressure p__1 in the clutch piston, likewise, can have an 0 bar or lower filling pressure level while the pressure p__2 on the side of the reset space 5 amounts to 2 bar, for example.

As is to be understood from FIG. 2, during a pressurization of the slide valve system with control pressure p__EDS for engaging the clutch 2, with the control pressure p__EDS rising from zero, the pressure p__2 is first lowered in the reset space 5 via the inverse proportional valve 11 thereof whereby the piston force F undergoes an increase.

The pressure p__2 is modulated, in the reset space 5, and reduced to zero by the second holding valve 11. In the meantime the pressure p__1 in the piston space 4 remains substantially constant at a low filling pressure level.

When the pressure p__2 in the reset space 5 has reached a minimum at a p__EDS__1, the pressure value of the pressure-adjuster control pressure p__EDS, shifts automatically the second holding valve 11 associated with the reset space 5. In the embodiment shown, when reaching the pressure value p__EDS which can amount to, for example, 0.4 bar, a respective pressure p__1 and p__2 of 0 bar is present both in the piston space 4 and in the reset space 5. At this moment, due to the displacement of the piston 13 of the first clutch valve 8, the connection thereof for the line 18 conveying system pressure p__sys begins to open whereby, on one hand, rising pressure p__1 is passed into the piston space 4 and, on the other, into the third central valve space 23C of the second clutch valve 9. Said pressure arrives unhindered at the reset space 5 via the second holding valve 11 associated with the reset space 5 so that the pressure p__2, adjacent to the reset space 5, corresponds to the pressure p__1 of the piston space 4.

In this state, only the force upon the differential surface by which the surface A__1 of the clutch piston 3 on the clutch space side 4 is stronger than the surface A__2 on the reset space side 5 still acts upon the clutch piston 3. During this phase, the force increase of the piston force F is correspondingly weaker.

Starting from a pressure value p__EDS__2 of the pressure-adjuster control pressure p__EDS pre-defined by the dimensions of the slide valve system, the connection of the line 17 conveying p__v pressure increasingly opens in the second clutch valve 9 while the connection to the pressure line 6 conveying the pressure p__1 of the piston space 4 increasingly closes. This takes effect in the sense that as the pressure-adjuster control pressure p__EDS increases, from this moment, the pressure p__1 in the piston space 4 increases further while the pressure p__2 in the reset space 5 is steadily reduced by the second clutch valve 9.

In the embodiment shown, the pressure value p__EDS__2 can amount to 2.2 bar while the pressures p__1 and p__2 in the piston space 4 and reset space 5 have increased at that time up to 3.5 bar.

The pressure p__2 on the side of the reset space has to be reduced down to a value of 0 bar, by a steadily controllable function, in order to prevent discontinuities in the curve of the force F of the clutch piston 3.

When the pressure p__2 on the reset space side is reduced down, at this pressure-adjuster pressure value p__EDS__3, which amounts to 4.4 bar, for example, the pressure p__1 on the side of the piston space 4 suddenly increases to a value of 7.8 bar, for example, and thus is shifted to the adjacent system pressure p__sys. Thus terminates the modulation of the first clutch valve 8 and the adjacent clutch pressure p__1 is retained by the first holding valve 10 associated with the piston space 4. To ensure this state with maximum transmitting capacity on the clutch 2, the control pressure p__EDS can be increased further by 0.5 bar.

Figure 4:
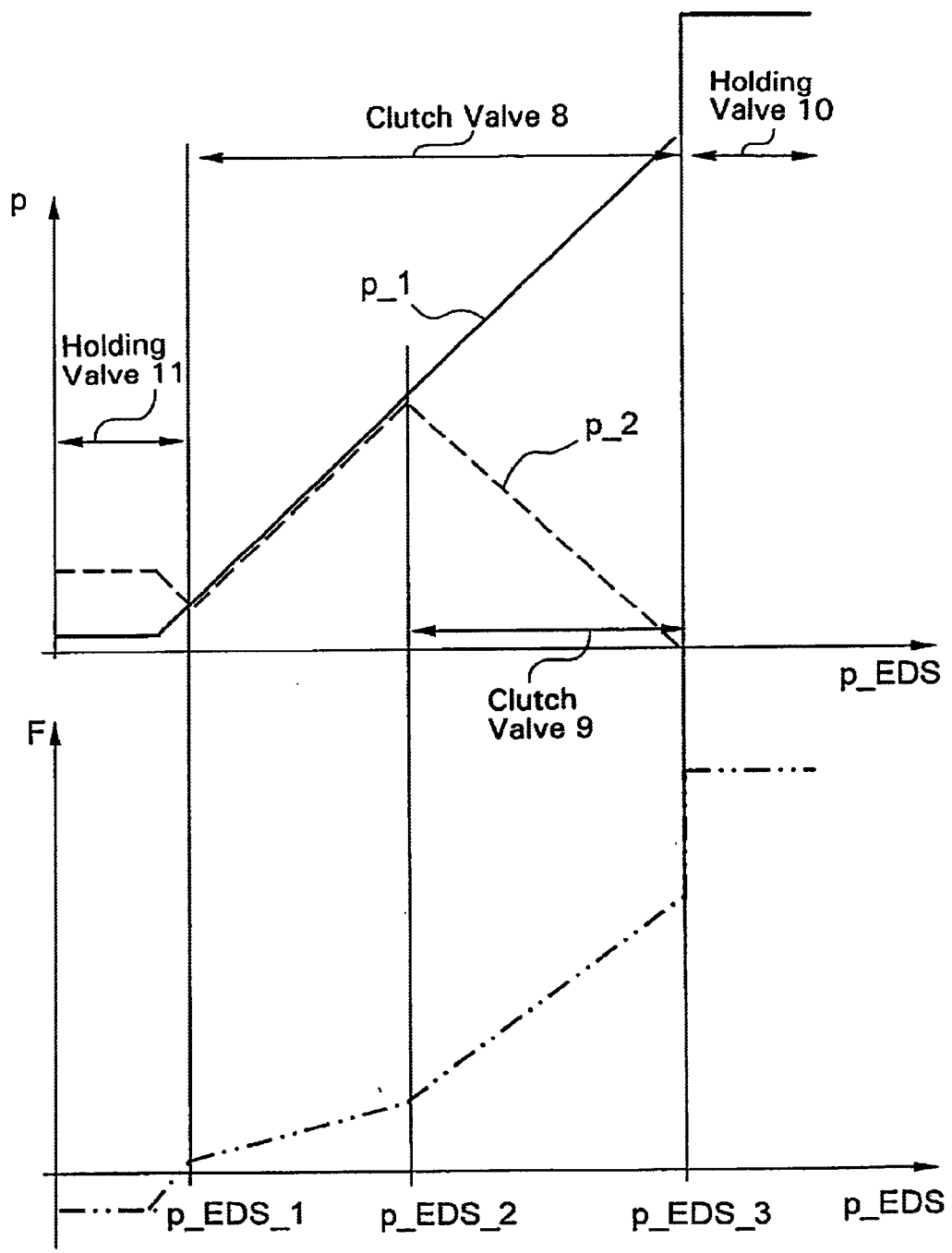

Observing the power and pressure curves of FIG. 4 belonging to the embodiment of FIG. 3, it appears, unlike the curves of FIG. 2, that at the start of an activation of the clutch 2, that is, with the increase of the pressure-adjuster control pressure p__EDS departing from a zero value, at first no change occurs in the pressure p__1 on the side of the clutch space or in the pressure p__2 on the side of the reset space 5. Only with a rise of the pressure p__1 on the clutch space side 4 does a rise occurs, as result of the control of the second holding valve 11 associated with the reset space 5 and depending on the pressure p__1 on the piston space side 4, in the pressures p__1, p__2 adjacent both sides of the clutch piston 3 from the pressure-adjuster control pressure p__EDS__1 at the same pressure level up to the pressure-adjuster control pressure value p__EDS__2. Starting from the pre-defined pressure-adjuster control pressure value p__EDS__2, like described in the embodiment of FIG. 1, a reduction of the pressure p__2 of the reset space 5 to a zero value results while the pressure p__1 in the piston space 4 is further raised up to the pressure-adjuster control pressure value p__EDS__3 in order to be shifted to a system pressure level with maximum force F of the clutch piston 3.

It is obvious that the invention is not limited to the two embodiments shown, since the inventive device can be adapted to any dimensions of the pressurized surface of the clutch piston. In the embodiments shown, the surface of the clutch piston on the clutch space side is larger than the surface on the recoil space side. But in other embodiments, an inverse arrangement with corresponding modifications of the slide valve system and other surface ratios adequate for the existing case is possible, since the surfaces A__1, A__2 can be arbitrarily selected in the system with relation to object of the invention.

Differently from the embodiments shown, the valves of the shown slide valve system can optionally be combined to form units.

REFERENCE NUMERALS

1, 1' device
2 clutch
3 clutch piston
4 piston space
5 reset space
6 pressure line
7 pressure line
8 first clutch valve
8A, 8B, 8C valve space
9 second clutch valve
9A, 9B, 9C valve space
10 first holding valve
10A, 10B, 10C valve space
11 second holding valve
11A, 11B, 11C valve space 12 electronic pressure adjuster
13 valve piston of the first clutch valve
13A, 13B, 13C piston section
14 spring device
15 control pressure line
17 [[Vorbefülldruck]] pressure conveying line
18 line conveying system pressure
19 discharge line
20 valve piston of the first holding valve
20A, 20B piston section
21 spring device
22 discharge line
23 valve piston of the first clutch valve
23A, 23B, 23C piston section
24 spring device
25 line
26 line
27 valve piston of the second holding valve
27A, 27B piston valve
28 spring device
29 branch line of the control pressure line
30 branch line of the pressure line to clutch space
A_1 surface of the shift piston on the clutch space side
A_2 surface of the shift piston on the reset space side
F force of the clutch piston
p pressure
p_1 pressure on clutch piston on clutch space side
p_2 pressure on the clutch piston on the reset space side
p_EDS control pressure of the pressure adjuster
p_EDS_1 pressure adjuster control pressure value
p_EDS_2 pressure adjuster control pressure value
p_EDS_3 pressure adjuster control pressure value
p_sys system pressure
p_v [[Vorbefülldruck]] pressure

What is claimed is:

1. A device for controlling a hydraulically actuatable shifting element (2) of a motor vehicle transmission, the device comprising:

a clutch piston (3) which defines with a first surface (A_1) a hydraulically pressurizable clutch space (4) and defines with a second surface (A_2) of a different size a hydraulically pressurizable reset space (5);

a slide valve system which has a first clutch valve (8) associated with the clutch space (4), a second clutch valve (9) associated with the reset space (5) and a holding valve (11) associated with the reset space (5);

the first clutch valve (8), second clutch valve (9) and holding valve are movable according to a control pressure (p_EDS) adjusted by a pressure adjuster (12);

a pressure change between a pressurization of the clutch piston (3) on the clutch space (4) side and on the reset space (5) side being carried out as a control function so that the clutch piston (3), on the second surface (A_2) facing the reset space (5), is pressurized in an unshifted state of the shifting element (2) and, is emptied in a shifted state of the shifting element (2); and wherein both first and second surfaces (A_1, A_2) of the clutch piston (3), when the shifting element is engaged, are correspondingly pressurized up to a pre-defined pressure-adjuster control pressure (p_EDS_2) with at least approximately the same pressure.

2. The device according to claim 1, wherein the pressure in the reset space (5), after reaching the pre-defined pressure-adjuster control pressure (p_EDS_2), is reduced by the second clutch valve (9) and the pressure in the clutch space (4) is further increased by the first clutch valve (8).

3. The device according to claim 1, wherein the ratio of the first and second surfaces (A_1, A_2) of the clutch piston (3) and the pre-defined pressure-adjuster control pressure (p_EDS) are designed such that pre-defined shifts, critical to shift quality, occur at least predominantly during pressurization of both the first and second surfaces (A_1, A_2) of the clutch piston (3) with the same pressure.

4. The device according to claim 1, wherein the holding valve (11) associated with the reset space (5) is designed as an inverse proportional pressure-reducing valve.

5. The device according to claim 1, wherein a pressure-adjuster control pressure (p_EDS), concentrated on the first clutch valve (8) and on the second clutch valve (9), is supplied as a control pressure to the holding valve (11) associated with the reset space (5).

6. The device according to claim 1, wherein pressure (p_1), concentrated on the clutch space (4), is supplied as a control pressure to the holding valve (11) associated with the reset space (5).

7. The device according to claim 1, wherein the first clutch valve (8) is a proportional pressure-reducing valve and the second clutch valve (9) is an inverse-proportional pressure-reducing valve with pressure-adjuster control pressure (p_EDS) shared with the first clutch valve or as proportional pressure-reducing valve with separate pressure-adjuster control pressure.

8. The device according to claim 1, wherein the holding valve (11) associated with the reset space (5) has a valve piston (27) with several sections (27A, 27B) which define a first valve space (11A) pressurizable with a control pressure (p_EDS); a second valve space (11B) equipped with a spring (28) which counteracts the control pressure (p_EDS; p_1); and a third valve space (11C) connected with the reset space (5) and, according to the position of the valve piston (27), with a pressure line (18) conveying system pressure (p_sys) and, when the first valve space (11A) is pressurized, is increasingly connected with a pressure line (25) leading to the second clutch valve (9).

9. The device according to claim 1, wherein the first clutch valve (8) has a valve piston (13) with several sections (13A, 13B, 13C) which define a first valve space (8A) pressurizable with pressure-adjuster control pressure (p_EDS); a second valve space (8B) equipped with a spring (14) which counteracts the pressure-adjuster control pressure (p_EDS); and a third valve space (8C) connected with the clutch space (4) of a pressure line (17) conveying filling pressure (p_v) and, during pressurization of the first valve space (8A), is increasingly connected with a pressure line (15) conveying system pressure (p_sys) to the device.

10. The device according to claim 9, wherein a discharge line (19) is located between a connection of the line (17) conveying filling pressure (p_v) and the first valve space (8A), which is at least partly closed during pressurization of the first valve space (8A) with the pressure-adjuster control pressure (p_EDS).

11. The device according to claim 1, wherein the second clutch valve (9) has a valve piston (23) with several piston sections (23A, 23B, 23C) which define a first valve space (9A) pressurizable with the pressure-adjuster control pressure (p_EDS); a second valve space (9B) equipped with a spring (24) which counteracts the pressure-adjuster control pressure (p_EDS); and a third valve space (9C) connected with the holding valve (11) associated with the reset space (5) and a connectable thereby with the reset space (5) and, according to the position of the valve piston (23), with a pressure line (6) leading to the clutch space (4) and, during pressurization of the first valve space (9A), is increasingly connected with a pressure line (17) conveying the filling pressure (p_v).

12. The device according to claim 11, wherein a line (26) branches off, between a connection to the line (6) leading to the clutch space (4) and the first valve space (9A) which discharges in the line (25) leading to the holding valve (11) and, depending on the position thereof, to the reset space (5).

13. The device according to claim 1, wherein a holding valve (10) is associated with the clutch space (4).

14. The device according to claim 13, wherein the holding valve (10) associated with the clutch space (4) has a holding valve piston (20) with several sections (20A, 20B) which define a first valve space (10A) pressurizable with the pressure-adjuster control pressure (p_EDS); a second valve space (10B) equipped with a spring (21) that counteracts the pressure-adjuster control pressure (p_EDS); and a third valve space (10C) connected with a pressure line (16) leading to the first clutch valve (8) and, according to the position of the holding valve piston (20), with a pressure line (6) leading to the clutch space (4) or is increasingly connected with a discharge line (22) when the first valve space (10A) is pressurized.

15. The device according to claim 13, wherein the motor vehicle transmission is a powershift transmission.

* * * * *